Figure 1:
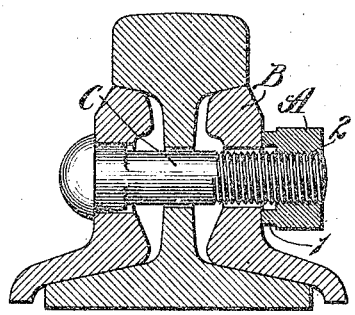

J. S. McGUIGAN.
BOLT NUT.
APPLICATION FILED OCT. 31, 1914.

1,208,997.

Patented Dec. 19, 1916.

Witnesses:
Geo. R. Ladson
[signature]

Inventor,
Joseph S. McGuigan
By Bakewell Church Attys

UNITED STATES PATENT OFFICE.

JOSEPH S. McGUIGAN, OF ST. LOUIS, MISSOURI.

BOLT-NUT.

1,208,997.
Specification of Letters Patent.
Patented Dec. 19, 1916.

Application filed October 31, 1914. Serial No. 869,549.

*To all whom it may concern:*

Be it known that I, JOSEPH S. McGUIGAN, a citizen of the United States, residing at St. Louis, Missouri, have invented a certain new and useful Improvement in Bolt-Nuts, of which the following is a full, clear, and exact description, such as will enable others skilled in the art to which it appertains to make and use the same.

This invention relates to nuts such as are used on bolts, and has for its main object to provide a practicable and inexpensive nut which is so designed that it will be impossible for the object through which the bolt passes to damage or strip sufficient threads on the bolt, due to relative movement between said object and bolt, to prevent the nut from being tightened to compensate for elongation or stretching of the bolt.

In other words, the main object of my invention is to provide a nut that can be tightened even after the threads on the bolt have become worn or damaged by rubbing or abrasion of the object through which the bolt passes.

Another object is to provide a nut of the character mentioned, that is as strong as a standard nut and which is so designed that it exerts a positive thrust against the object through which the bolt passes. And still another object is to provide a nut of the character described in which an integral portion of the nut that protects the threads on the bolt also serves to lock the nut and prevent it from rotating backwardly on the bolt.

Briefly described, my invention consists in a nut provided on its inner side with an integral portion which is so constructed that it will not bear against or come in contact with the threads of the bolt on which the nut is mounted, said integral portion preferably consisting of an annular collar on the inner side of the nut whose internal diameter is greater than the diameter of the internally screw-threaded bore in the nut that receives the bolt. When the nut is arranged in operative position on the bolt said integral collar bears against the object through which the bolt passes and exerts a direct thrust against said object in exactly the same manner as an ordinary nut acts on the object through which the bolt passes. If the bolt, or the member through which the bolt passes, move relatively to each other sufficiently to cause said member to mar or damage the threads on the bolt, this will not interfere with tightening the nut to compensate for elongation or stretching of the bolt, owing to the fact that the threads on the bolt which are brought into service when the nut is tightened are protected by the integral portion or collar on the inner side of the nut.

Figure 2:
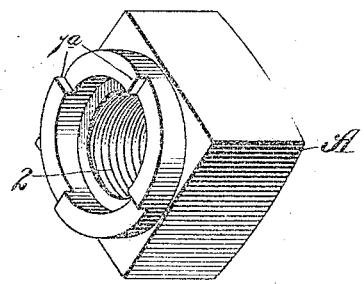

Figure 1 of the drawings is a sectional view illustrating my improved nut applied to a bolt used for securing railway track splice bars in operative position; and Fig. 2 is a perspective view of said nut.

The nut A is preferably of standard make, so far as external dimensions and number of screw threads are concerned, and it is provided on its inner side with an integral rigid portion 1 that has a blunt edge which bears against the object B, through which the bolt C passes. This integral portion 1 preferably consists of a collar or annular rib on the inner side of the nut, whose internal diameter is enough greater than the internally screw-threaded bore 2 in the nut to prevent said collar 1 from bearing on the threads of the bolt. If the bolt, or the member B through which the bolt passes, should move relatively to each other sufficiently to cause said member B to wear down the threads on the bolt, this will not interfere with subsequent tightening of the nut, owing to the fact that the threads on the bolt which are brought into service when the nut is tightened are protected by the portion 1 on the inner side of the nut. In other words, the portion 1 of my improved nut insures sufficient threads on the bolt remaining in their original condition to permit the nut to be tightened time after time.

While the nut is capable of general use, it is particularly adapted for use on track bolts, owing to the fact that the bolts used in such structure are soon rendered unfit for use by reason of the splice bars moving up and down and damaging or wearing away threads on the portions of the bolts that pass through the splice bars. If nut lock washers are interposed between the splice bars and the nuts on the bolts, said washers soon wear out the threads on the portions of the bolts that pass through the washers and render them unfit for use, this, of course, being due to the fact that the excessive vibration to which railway track structures are subjected and the expansion and contraction of the track rails causes the nut lock washers to move up and down and side-wise on the bolts. As it is necessary to tighten the nuts on track bolts frequently to compensate for the elongation or stretching of the bolts, such bolts can only be used for a short period, due, of course, to the fact that the nut lock washers or the splice bars damage the threads on the bolts to such a degree that the nuts can only be taken up or tightened a few times. Consequently, the cost of replacing worn bolts is quite an item in the maintenance of a railway track, for if the traffic is heavy the track bolts frequently wear out in the course of a few months.

My improved nut overcomes the necessity of replacing track bolts frequently and enables such bolts to be used until the heads on same have worn down to such an extent that they are only a trifle larger than the opening in the splice bar through which the shank of the bolt passes. In other words, by providing the nut with a portion that protects the threads on the portion of the bolt lying between the splice bar and the internally screw-threaded bore in the nut, it is possible to tighten the nut time after time, as these protected threads remain in their original condition, and consequently, will coöperate with the threads on the nut. Therefore, my improved nut not only effects a great saving in the cost of maintaining a railway track, due to not having to renew the track bolts frequently, but it also effects a great saving in labor, in that it overcomes the necessity of removing worn bolts and substituting new ones.

The collar 1 does not project laterally beyond the marginal edges of the nut, and as it consists of an integral rigid portion on the nut, it exerts a direct thrust against the splice bar when the nut is tightened in exactly the same manner as an ordinary nut acts on a splice bar or on an object through which the bolt passes. The portion 1 of the nut is provided with teeth 1ª, as shown in Fig. 2, that bite into the splice bar or other member through which the bolt passes, and thus prevent the nut from turning backwardly on the bolt.

Having thus described my invention, what I claim and desire to secure by Letters Patent is:

A bolt nut having a body portion for engaging the threads of the bolt on which the nut is mounted, an annular collar on the inner side of said body portion which is rigid and integrally connected to said body portion, said collar having a center opening which is enough larger than the bolt so that the collar will not contact with the bolt, and a plurality of integral teeth on said collar that are adapted to bite into the member against which the nut bears, said teeth being so disposed that they prevent the nut from canting or tilting sidewise and the biting end of each tooth extending parallel to the face of the member against which the nut bears so that each tooth will engage said member evenly and throughout the entire length of its biting edge.

In testimony whereof I hereunto affix my signature in the presence of two witnesses, this twenty-eighth day of October, 1914.

JOSEPH S. McGUIGAN.

Witnesses:
W. L. CHURCH,
GEORGE BAKEWELL.